(12) United States Patent
Lee et al.

(10) Patent No.: US 12,502,430 B2
(45) Date of Patent: Dec. 23, 2025

(54) COMPOUND FOR PHOTODYNAMIC THERAPY OF CANCER, COMPOSITION INCLUDING SAME, AND METHOD FOR PHOTODYNAMIC THERAPY OF CANCER

(71) Applicant: Pukyong National University Industry-University Cooperation Foundation, Busan (KR)

(72) Inventors: Song Yi Lee, Busan (KR); Ji Chung Park, Busan (KR)

(73) Assignee: Pukyong National University Industry-University Cooperation Foundation, Busan (KR)

( * ) Notice: Subject to any disclaimer, the term of this patent is extended or adjusted under 35 U.S.C. 154(b) by 937 days.

(21) Appl. No.: 17/621,632

(22) PCT Filed: Mar. 2, 2021

(86) PCT No.: PCT/KR2021/002533
§ 371 (c)(1),
(2) Date: Dec. 21, 2021

(87) PCT Pub. No.: WO2022/169019
PCT Pub. Date: Aug. 11, 2022

(65) Prior Publication Data
US 2023/0015033 A1     Jan. 19, 2023

(30) Foreign Application Priority Data

Feb. 4, 2021   (KR) .................. 10-2021-0016341

(51) Int. Cl.
*A61K 41/00*     (2020.01)
*A61K 49/00*     (2006.01)
*C07D 471/06*    (2006.01)

(52) U.S. Cl.
CPC ........ *A61K 41/008* (2013.01); *A61K 49/0021* (2013.01); *C07D 471/06* (2013.01)

(58) Field of Classification Search
CPC .................. A61K 41/0057; A61K 41/008
See application file for complete search history.

(56) References Cited

FOREIGN PATENT DOCUMENTS

| KR | 2020-0135058 | 12/2020 | |
| WO | WO-2020242051 A1 * | 12/2020 | ........... A61K 31/473 |

OTHER PUBLICATIONS

Palmer et al (Visible-Light-Driven Triplet Sensitization of Polycyclic Aromatic Hydrocarbons Using Thionated Perinones; J, Phys. Chem. Left; 2020, 11, 5092-5099 (Year: 2020).*
Palmer, J.R. et al., "Visible-light-driven triplet sensitization of polycyclic aromatic hydrocarbons using thionated perinones", The Journal of Physical Chemistry Letters, vol. 11, pp. 5092-5099, (2020).
Huang, T-B et al., "General synthesis of thioxo-1,8-naphthalimides via thioxo-1,8-naphthalic anhydrides", Synthesis, No. 7, pp. 1109-1111, (1999).
Nguyen, V-N. et al., "Design and synthesis of efficient heavy-atom-free photosensitizers for photodynamic therapy of cancer", Chemical Communications, vol. 56, pp. 11489-11492, (2020).
Pham, T.C. et al., "Molecular design toward heavy-atom-free photosensitizers based on the C=S bond and their dual functions in hypoxia photodynamic cancer therapy and ClO⁻ detection", ACS Applied Materials & Interfaces, vol. 13, pp. 13949-13957, (2021).

\* cited by examiner

*Primary Examiner* — Micah Paul Young
(74) *Attorney, Agent, or Firm* — EVAN LAW GROUP LLC

(57) ABSTRACT

The present disclosure relates to a novel compound for photodynamic therapy of cancer, a composition including the same, and a method for photodynamic therapy of cancer, and more specifically, a novel photosensitizer compound based on NpImidazole having a C=S functional group introduced, a composition and sensor including the same and a method for photodynamic therapy using the same.

15 Claims, 12 Drawing Sheets

COMPOUND FOR PHOTODYNAMIC THERAPY OF CANCER, COMPOSITION INCLUDING SAME, AND METHOD FOR PHOTODYNAMIC THERAPY OF CANCER

TECHNICAL FIELD

The present disclosure relates to a novel compound for photodynamic therapy of cancer, a composition including the same, and a method for photodynamic therapy of cancer using the compound.

BACKGROUND ART

Photodynamic therapy (PDT) is a treatment for damaging and necrotizing a target tissue by injecting a photosensitizer (referred to as PS) into the body and then irradiating light of a specific wavelength to generate active oxygen. PDT may effectively treat local areas without surgery. Thus, it is recognized as one of the most promising treatments. Accordingly, research on the development and application of photosensitizers has been actively conducted in recent years.

Photosensitizers show negligible cancer cell cytotoxicity, but when photosensitizers are irradiated with light in the presence of molecular oxygen, the formation of reactive oxygen species (ROS) is promoted through type I or type II processes to lead cytotoxicity. The type I reaction generates radical cations or radical anions such as $OH\cdot$, $O^{-2\cdot}$ and causes photo-induced electron transfer between the substrate and the triplet state photosensitizer.

The type II reaction converts molecular oxygen ($^3O_2$) into highly reactive singlet oxygen ($^1O_2$). Accordingly, the type I process has a more efficient PDT in tumor hypoxia with low molecular oxygen concentrations. The type I process involves a more efficient PDT effect in states of tumor hypoxia having low molecular oxygen concentrations. The type I process involves a more efficient PDT in states of tumor hypoxia including low molecular oxygen concentrations. The generated ROS may damage proteins, hexanes, lipids, membranes, and organelles that induce apoptosis.

To act as an effective photosensitizer, the excited electrons must transition from a singlet state to a triplet state after irradiation with light of a specific wavelength. For this situation, most heavy metals must be included. In other words, the excitation of the fluorescence photosensitizer has a short lifetime and rapidly releases from the lowest singlet-excited state ($S_1$) to the ground state. On the other hand, if a heavy atom is incorporated into the core structure, it may include a low triplet-excited state $T_n$ that is filled in the $S_1$ state through a spin-forbidden intersystem crossing (ISC) process. Due to their long lifetime, triplet-excited states may effectively transfer energy to other molecules such as $^3O_2$. However, a heavy metal (heavy atom) is used for a photosensitizer to cause toxicity, increased cost, low solubility, and other side effects in the tissue.

Recently, studies have been conducted on selective fluorescent probes for imaging ROS including $OCl^-$, $H_2O_2$, NO, $ONOO^-$, $\cdot O_2{-}$, $^1O_2$, etc. In particular, hypochlorite (HOCl/$OCl^-$) is mainly produced by the catalyzed reaction of myeloperoxidase (MPO) of $H_2O_2$ and $Cl^-$ in immunocytes and reacts rapidly with amino acids, proteins, cholesterol, and nucleosides. In order to understand the important functions of $OCl^-$, it is essential to image and monitor $OCl^-$ in live cells.

Since heavy metals accumulate in the body to cause various diseases, it is necessary to develop a new photosensitizer that does not contain heavy metals. At the same time, when all the excited electrons of the fluorescent probe are transferred to the triplet state, bio-imaging is impossible because fluorescence is not emitted. Therefore, it is necessary to design and synthesize a new photosensitizer having a photodynamic treatment function and a fluorescence imaging function at the same time.

DISCLOSURE OF THE INVENTION

Technical Goals

In order to address the above-mentioned issues, the present disclosure provides a novel photosensitizer compound that may be applied as a fluorescent dye for selective detection and fluorescence imaging of hypochlorous acid ($OCl^-$) as well as photodynamic therapy such as cancer cell death.

The present disclosure provides a composition for photodynamic therapy and/or selective detection and fluorescence imaging of hypochlorous acid ($OCl^-$), including a compound according to the present disclosure.

The present disclosure relates to a sensor for detection and fluorescence imaging of hypochlorous acid ($OCl^-$), including a compound according to the present disclosure.

The present disclosure relates to a method of photodynamic therapy using a compound according to the present disclosure.

The present disclosure relates to a method for selective detection and fluorescence imaging of hypochlorous acid ($OCl^-$) using a compound according to the present disclosure.

However, the problems to be solved by the present disclosure are not limited to those mentioned above, and other problems not mentioned will be clearly understood by those skilled in the art from the following description.

Technical Solutions

According to an example embodiment of the present disclosure, there is provided a compound represented by the following chemical formula 1:

[Chemical formula 1]

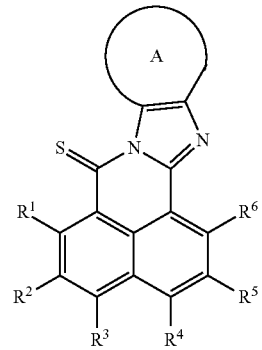

(Here, ring A is a substituted or unsubstituted aromatic ring, the ring A is fused benzene or an aromatic ring in which the fused benzene and 1 to 5 aromatic rings are fused, and the substituted aromatic ring is substituted by a substituent selected from the group consisting of heavy hydrogen, halogen, alkyl having 1 to 20 carbon atoms, cycloalkyl having 5 to 20 carbon atoms, heteroalkyl having 5 to 20 carbon atoms, arylalkyl having 6 to 30 carbon atoms, alkoxy having 1 to 20 carbon atoms, amino, alkenyl having 2 to 20 carbon atoms, cycloalkenyl having 5 to 30 carbon atoms, heteroalkenyl having 5 to 30 carbon atoms, alkynyl having 2 to 20 carbon atoms, aryl having 6 to 30 carbon atoms, and heteroaryl having 5 to 30 carbon atoms, and $R^1$ to $R^6$ are, independently, selected from the group consisting of hydrogen, halogen, alkyl having 1 to 20 carbon atoms, cycloalkyl having 5 to 20 carbon atoms, heteroalkyl having 5 to 20 carbon atoms, arylalkyl having 6 to 30 carbon atoms, alkoxy having 1 to 20 carbon atoms, aryloxy having 6 to 20 carbon atoms, amino, alkenyl having 2 to 20 carbon atoms, cycloalkenyl having 5 to 20 carbon atoms, heteroalkenyl having 5 to 20 carbon atoms, alkynyl having 2 to 20 carbon atoms, aryl having 6 to 30 carbon atoms, and heteroaryl having 5 to 30 carbon atoms).

According to an example embodiment of the present disclosure, the compound may be selected from the following chemical formulas 1-1 and 1-2:

[Chemical formula 1-1]

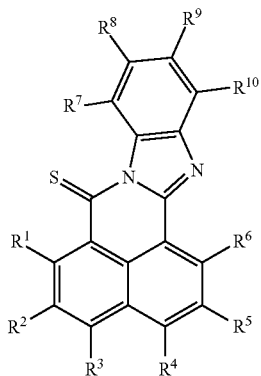

(Here, $R^1$ to $R^6$ are, independently, selected from the group consisting of hydrogen, halogen, straight or branched chain alkyl having 1 to 10 carbon atoms, alkenyl having 2 to 10 carbon atoms, and aryl having 6 to 10 carbon atoms, and $R^7$ to $R^{10}$ are, independently, selected from the group consisting of hydrogen, halogen, straight or branched chain alkyl having 1 to 10 carbon atoms and alkenyl having 2 to 10 carbon atoms), and

[Chemical formula 1-2]

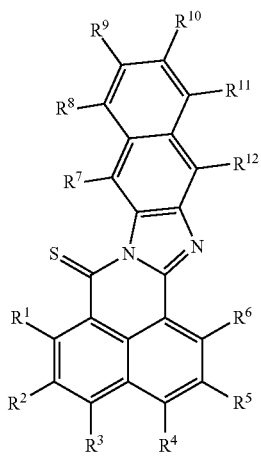

(Here, $R^1$ to $R^6$ are, independently, selected from the group consisting of hydrogen, halogen, straight or branched chain alkyl having 1 to 10 carbon atoms, alkenyl having 2 to 10 carbon atoms, and aryl having 6 to 10 carbon atoms, and $R^7$ to $R^{12}$ are, independently, selected from the group consisting of hydrogen, halogen, straight or branched chain alkyl having 1 to 10 carbon atoms and alkenyl having 2 to 10 carbon atoms).

According to an example embodiment of the present disclosure, the compound may be a heavy metal-free triplet photosensitizer for fluorescence imaging and photodynamic therapy.

According to an example embodiment of the present disclosure, there is provided a composition including the compound represented by chemical formula 1 according to the present disclosure, a salt thereof, or both.

According to an example embodiment of the present disclosure, the salt in the composition may be a pharmaceutically acceptable salt, and the composition may be used for photodynamic therapy and have a cell death function in a normoxia condition and a hypoxia condition when irradiated with light.

According to an example embodiment of the present disclosure, the photodynamic therapy may allow the removal or reduction of cancer cells, tumor cells, or hyperproliferative cells.

According to an example embodiment of the present disclosure, the composition may be used for selective detection and fluorescence imaging of in vivo or in vitro hypochlorous acid ($OCl^-$).

According to an example embodiment of the present disclosure, the composition may further include water, an organic solvent, or both, and the pH of the composition may be in a range of 7 to 8.

According to an example embodiment of the present disclosure, there is provided a sensor for the detection of hypochlorous acid ($OCl^-$), in which the sensor includes the compound represented by chemical formula 1 according to the present disclosure, a salt thereof or both, and the sensor has a selective optical property change with respect to $OCl^-$.

According to an example embodiment of the present disclosure, the sensor may be a fluorescent sensor, and the sensor may measure the fluorescence signal or perform fluorescence imaging.

According to an example embodiment of the present disclosure, the sensor may measure the change in fluorescence intensity according to Equation 1 below:

$$(I/I_0) \geq 10$$

in which I represents fluorescence intensity after contacting with hypochlorous acid ($OCl^-$) and $I_0$ represents initial fluorescence intensity.

According to an example embodiment of the present disclosure, the detection limit for hypochlorous acid (OCl—) of the sensor may be 5 μM or less.

According to an example embodiment of the present disclosure, there is provided a method for photodynamic therapy, the method including contacting the compound represented by chemical formula 1 according to the present disclosure, a pharmaceutically acceptable salt thereof, or both with a cell to be treated, and irradiating light to the contacted cell region.

According to an example embodiment of the present disclosure, the irradiating of the light may cause the extinction of the cell to be treated by irradiating blue light.

According to an example embodiment of the present disclosure, the method may further include, after the irradiating of the light, analyzing optical property change of the light-irradiated cell region.

According to an example embodiment of the present disclosure, the analyzing of the optical property change may include performing fluorescence imaging of the light-irradiated cell region or performing fluorescence imaging after treating the light-irradiated cell region with a hypochlorous acid ($OCl^-$) solution.

Effects

The present disclosure provides a novel heavy-atom-free triplet photosensitizer that may be used as a fluorescent dye having selectivity for hypochlorous acid ($OCl^-$) and a therapeutic agent for photodynamic therapy (PDT) in which the photosensitizer may efficiently generate a triplet-excited state with high singlet oxygen quantum yields, rapidly induce cell death under blue light irradiation in both normoxia and hypoxia and exhibit high sensitivity and selectivity to hypochlorous acid ($OCl^-$).

The present disclosure may utilize the photosensitizer as a fluorescent sensor and an optical sensor for selective detection and analysis of hypochlorous acid ($OCl^-$) and provide a pharmaceutical composition (or formulation) for photodynamic therapy using the photosensitizer and a method for photodynamic therapy using the same.

BEST MODE FOR CARRYING OUT THE INVENTION

Figure 1A:
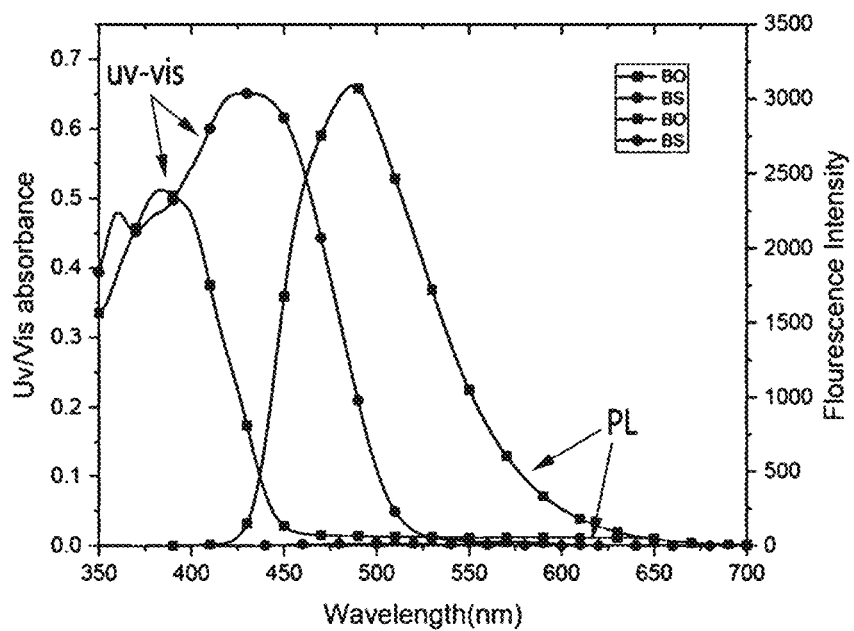
FIG. 1A is a diagram illustrating UV-Vis absorption (black line) and PL spectrum (red line), which shows BO and BS (60 μM, $\lambda_{ex}$ at maximum absorption wavelength, slit 5/5) according to an example embodiment of the present disclosure.

Hereinafter, example embodiments of the present disclosure are described in detail. In describing the present disclosure, if it is determined that a detailed description of a related known function or configuration may unnecessarily obscure the gist of the present disclosure, the detailed description thereof is excluded. Further, the terms used in this specification are terms used to properly express a preferred embodiment of the present disclosure, which may vary according to the intention of a user or operator, or a custom in the field to which the present disclosure belongs. Accordingly, definitions of these terms should be made based on the content throughout this specification.

Throughout the specification, when a member is said to be positioned "on" another member, this includes not only a case in which a member is in contact with another member but also a case in which still another member exists between the two members.

Throughout the specification, when a part "includes" a certain component, it means that other components may be further included, rather than excluding other components.

The present disclosure relates to a novel photosensitizer compound, and the photosensitizer compound according to an example embodiment of the present disclosure is a novel triplet photosensitizer and relates to a "thionated NpImidazole derivative." The "thionated NpImidazole derivative" may exhibit a dual function that may be used as a hypochlorous acid (OCl⁻) probe with high sensitivity and selectivity to hypochlorous acid (OCl⁻), one of the reactive oxygen species (ROS). The "thionated NpImidazole derivative" may be applied as a heavy metal-free triplet photosensitizer for fluorescence imaging and photodynamic therapy in vivo or in vitro. In other words, the photosensitizer is a pure organic material that does not include heavy metals, has excellent efficiency in generating reactive oxygen species when irradiated with light, and selectively detects hypochlorous acid (OCl⁻) in ROS in vivo or ex vivo environment so that it may be utilized as a fluorescent imaging dye and sensor.

According to an example embodiment of the present disclosure, the photosensitizer compound may be a compound represented by the following chemical formula 1, a salt thereof, or both.

[Chemical formula 1]

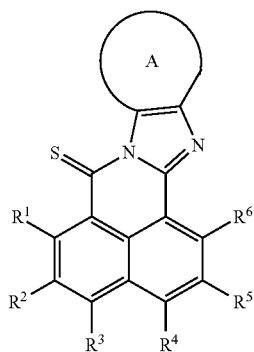

As an example of the present disclosure, in chemical formula 1, ring A is an aromatic ring or a heteroaromatic ring, and each of the aromatic ring and the heteroaromatic ring may be unsubstituted or substituted with a substituent. The substituents are not fused to an aromatic ring and include one or more selected from the group consisting of deuterium, halogen, alkyl, cycloalkyl, heteroalkyl, arylalkyl, alkoxy, amino, alkenyl, cycloalkenyl, heteroalkenyl, alkynyl, aryl, and heteroaryl, one or more rings constituting the ring A may be substituted with one or more substituents, and the substituents in the ring A may be the same or different.

The ring A may be a fused benzene or an aromatic ring in which the fused benzene and 1 to 5 aromatic rings are fused. Further, the fused benzene may be fused with a hydrocarbon ring having 5 to 6 carbon atoms. For example, the ring A may be formed by fusion of the following aromatic ring with the imidazole moiety of the chemical formula 1.

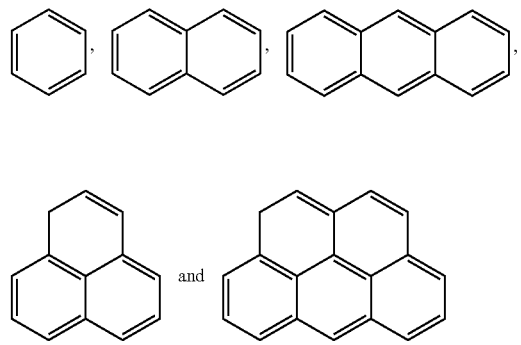

(Here, the aromatic ring may be unsubstituted or substituted with the aforementioned substituents, and any two carbons of the aromatic ring are moieties fused with the imidazole moiety).

$R^1$ to $R^6$ may be, independently, selected from the group consisting of hydrogen, halogen, alkyl, cycloalkyl, heteroalkyl, arylalkyl, alkoxy, aryloxy, amino, alkenyl, cycloalkenyl, heteroalkenyl, alkynyl, aryl and heteroaryl.

For example, the alkyl may be alkyl having 1 to 20 carbon atoms; 1 to 10 carbon atoms; or 1 to 5 carbon atoms and may be straight-chain or branched.

For example, the cycloalkyl and heteroalkyl each may be cycloalkyl having 5 to 20 carbon atoms; 5 to 15 carbon atoms; or 5 to 10 carbon atoms.

For example, the arylalkyl may be arylalkyl having 6 to 30 carbon atoms; 7 to 20 carbon atoms; or 6 to 15 carbon atoms.

For example, the alkoxy may be alkoxy having 1 to 20 carbon atoms; 1 to 10 carbon atoms; or 1 to 5 carbon atoms.

For example, the aryloxy may be aryloxy having 6 to 20 carbon atoms; 6 to 14 carbon atoms; or 6 to 10 carbon atoms.

For example, the alkenyl may be alkenyl having 2 to 20 carbon atoms; 2 to 10 carbon atoms; or 2 to 8 carbon atoms, and the cycloalkenyl and heteroalkenyl may be cycloalkenyl and heteroalkenyl having 5 to 30 carbon atoms; 5 to 20 carbon atoms; or 5 to 10 carbon atoms.

For example, the alkynyl may be alkynyl having 2 to 20 carbon atoms; 2 to 10 carbon atoms; or 2 to 8 carbon atoms.

For example, the aryl and heteroaryl may be aryl and heteroaryl having 5 to 30 carbon atoms; 6 to 30 carbon atoms; 5 to 14 carbon atoms; or 5 to 10 carbon atoms. For example, the heteroaryl may include at least 1 to 3 heteroatoms in each ring, and the heteroatom may be selected from N, O, or S heteroatoms.

For example, the halogen may be selected from the group consisting of —F, —Br, —Cl and —I.

Preferably, the substituent of the aromatic ring is at least one of halogen, straight-chain or branched-chain alkyl having 1 to 10 carbon atoms and alkenyl having 2 to 10 carbon atoms, and $R^1$ to $R^6$ may be, independently, selected from the group consisting of hydrogen, halogen, straight-chain or branched-chain alkyl having 1 to 10 carbon atoms, alkenyl having 2 to 10 carbon atoms, and aryl having 6 to 10 carbon atoms.

As an example of the present disclosure, the compound may be selected from the following chemical formulas 1-1 and 1-2.

[Chemical formula 1-1]

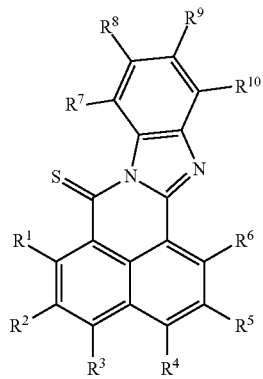

Here, $R^1$ to $R^6$ are, independently, selected from the group consisting of hydrogen, halogen, straight or branched chain alkyl having 1 to 10 carbon atoms, alkenyl having 2 to 10 carbon atoms, and aryl having 6 to 10 carbon atoms, and $R^7$ to $R^{10}$ are, independently, selected from the group consisting of hydrogen, halogen, straight or branched chain alkyl having 1 to 10 carbon atoms and alkenyl having 2 to 10 carbon atoms.

[Chemical formula 1-2]

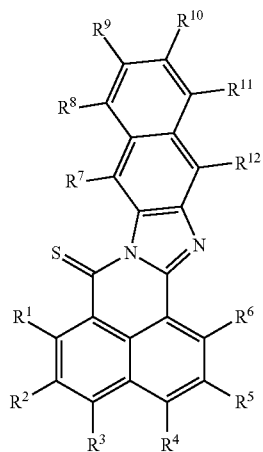

Here, $R^1$ to $R^6$ are, independently, selected from the group consisting of hydrogen, halogen, straight or branched chain alkyl having 1 to 10 carbon atoms, alkenyl having 2 to 10 carbon atoms, and aryl having 6 to 10 carbon atoms, and $R^7$ to $R^{12}$ are, independently, selected from the group consisting of hydrogen, halogen, straight or branched chain alkyl having 1 to 10 carbon atoms and alkenyl having 2 to 10 carbon atoms.

As an example of the present disclosure, the salt is derived from an inorganic acid or an organic acid and a base and may be, for example, a pharmaceutically acceptable salt. The inorganic and organic acids are hydrochloric acid, hydrobromic acid, sulfuric acid, nitric acid, perchloric acid, fumaric acid, maleic acid, phosphoric acid, glycolic acid, lactic acid, salicylic acid, succinic acid, toluene-p-sulfonic acid, tartaric acid, acetic acid, citric acid, methanesulfonic acid, ethanesulfonic acid, formic acid, benzoic acid, malonic acid, sulfonic acid, naphthalene-2-sulfonic acid, benzenesulfonic acid, and the like, but is not limited thereto.

The present disclosure relates to a composition including a compound represented by chemical formula 1 of the present disclosure, a salt thereof, or both. According to an example embodiment of the present disclosure, the composition may be a multifunctional composition for photodynamic therapy, for example, photodynamic therapy for cancer cell death and/or selective detection and fluorescence imaging of hypochlorous acid ($OCl^-$), which is one of the reactive oxygen species (ROS) by applying a photosensitizer in which C=S functional group is introduced into the organic fluorescent "NpImidazole" monomer to generate singlet oxygen ($^1O_2$) by irradiation with light of a specific wavelength.

According to an example embodiment of the present disclosure, the composition may be a pharmaceutical composition for photodynamic therapy and/or in vivo hypochlorous acid ($OCl^-$) selective detection and fluorescence imaging.

As an example of the present disclosure, it may be a composition including a compound represented by the chemical formula 1, a pharmaceutically acceptable salt thereof, or both; and a pharmaceutically acceptable carrier. The compound represented by chemical formula 1 and its salts have low cytotoxicity when not irradiated with light to have fewer side effects and may induce rapid cell death when irradiated with light. At the same time, it may not react with other ROSs excluding hypochlorous acid ($OCl^-$) and exhibit excellent selectivity and sensitivity to hypochlorous acid ($OCl^-$). That is, it may be used for intracellular fluorescence imaging after photodynamic therapy, or for hypochlorous acid ($OCl^-$) selective detection and fluorescence imaging.

As an example of the present disclosure, the composition is used for photodynamic therapy and has a cell death function in normoxia condition and hypoxia condition when light is irradiated, and the photodynamic treatment may allow the removal or reduction of cancer cells, tumor cells or hyperproliferative cells.

As an example of the present disclosure, the composition is used for diagnosis and treatment of a disease, condition or disorder, and may be applied for photodynamic therapy to treat cancer or reduce tumors including a cancer cell, tumor cell or hyperproliferative cell-related disease, condition or disorder, for example, head and neck cancer, breast cancer, uterine cancer, lung cancer, bladder cancer, colon cancer, prostate cancer and glioma, but is not limited thereto.

As an example of the present disclosure, as long as the carrier does not deviate from the purpose of the present disclosure, components used in the technical field of the present disclosure may be applied. The compound represented by chemical formula 1, a pharmaceutically acceptable salt thereof, or both may be included as a pharmaceutically active ingredient. They may be included more than 0% to 99%; 0.0001% to 99%; or 0.001% to 99% in the composition. For example, they may be included in a concentration of $1\times10^{-5}$ M (mol) or more, preferably $1\times10^{-5}$ M (mol) to $1\times10^{-2}$ M (mol), more preferably $1\times10^{-4}$ M (mol) to $1\times10^{-2}$ M (mol).

As an example of the present disclosure, the pH of the composition may be in a range of 7 to 8, which may be adjusted with a buffer solution.

According to an example embodiment of the present disclosure, the composition is a composition for selective detection and fluorescence imaging of hypochlorous acid ($OCl^-$) and may be used for qualitative and/or quantitative analysis of hypochlorous acid ($OCl^-$).

As an example of the present disclosure, the composition may be sensor composition for selective detection and fluorescence imaging of hypochlorous acid (OCl$^-$) including a compound represented by chemical formula 1, a salt thereof, or both; and a solvent.

As an example of the present disclosure, the solvent is capable of dissolving and/or diluting the compound represented by chemical formula 1 and a salt thereof so as to have a sensor function and may include water, an organic solvent, or both. The organic solvent may be primary to tetrahydric alcohol, THF, dimethylsulfoxide (DMSO), etc., but is not limited thereto.

As an example of the present disclosure, the compound represented by chemical formula 1, a salt thereof, or both may be included more than 0% to 99%; 0.0001% to 99%; or 0.001% to 99% in the composition. For example, they may be included in a concentration of $1 \times 10^{-5}$ M (mol) or more, preferably $1 \times 10^{-5}$ M (mol) to $1 \times 10^{-2}$ M (mol), more preferably $1 \times 10^{-4}$ M (mol) to $1 \times 10^{-2}$ M (mol). If the concentration is less than $10^{-5}$ M (mol), it may not be easy to observe when detecting hypochlorous acid (OCl$^-$) due to weak color change, absorbance, fluorescence wavelength, fluorescence intensity, etc. of the compound.

As an example of the present disclosure, the pH of the composition may be in a range of 7 to 8, which may be adjusted with a buffer solution.

As an example of the present disclosure, in vivo or in vitro selective detection and fluorescence imaging of hypochlorous acid (OCl$^-$) is performed such that when the composition contacts with hypochlorous acid (OCl$^-$), thereby changing the optical properties such as a change in at least one of color, fluorescence wavelength, fluorescence intensity, and absorbance (or color development intensity). In addition, color change or fluorescence intensity (or color development intensity) change may be observed with the naked eye without special equipment to confirm the presence of hypochlorous acid (OCl$^-$). Furthermore, qualitative and/or quantitative analysis of hypochlorous acid (OCl$^-$) may be performed using UV-Vis spectroscopy, fluorescence spectroscopy, etc., and fluorescence imaging may be performed with a confocal fluorescence intensity microscope or the like.

For example, the composition may exhibit a fluorescence emission characteristic of 500 nm to 600 nm, and the fluorescence intensity may be changed depending on before and after contact with hypochlorous acid (OCl$^-$). That is, it is possible to measure the change in fluorescence intensity according to Equation 1 below. This may confirm fluorescence enhancement by high sensitivity and selectivity to hypochlorous acid (OCl$^-$) and may be utilized for qualitative and quantitative analysis of hypochlorous acid (OCl$^-$).

$$(I/I_0) \geq A \quad \text{[Equation 1]}$$

(I: fluorescence intensity after contact with OCl$^-$, $I_0$: initial fluorescence intensity, A is an integer greater than or equal to 2; 3; 5; or 10; or an integer from 10 to 100).

As an example of the present disclosure, the detection limit of hypochlorous acid (OCl$^-$) in the composition is 10 μM or less; 5 μM or less; 0.01 to 10 μM; 0.1 to 5 μM, and this low detection limit may provide excellent selectivity as well as excellent sensitivity to hypochlorous acid (OCl$^-$).

According to an example embodiment of the present disclosure, the composition may be applied as a powder, a gel, an emulsion, or a liquid, or a molded article. The composition may be coated or impregnated on a support such as an analysis chip, electric circuit, fiber, pulp, polymer film, glass substrate, and the like to be applied to a sensor or the like.

The present disclosure relates to a sensor for the detection of hypochlorous acid (OCl$^-$) including a compound represented by chemical formula 1 according to the present disclosure, a salt thereof, or both, and the compound represented by chemical formula 1, a salt thereof, or both may exhibit selective optical property, for example, selective fluorescence, changes to hypochlorous acid (OCl$^-$).

As an example of the present disclosure, the sensor is a fluorescent sensor, and may measure a selective fluorescence signal for hypochlorous acid (OCl$^-$) or perform fluorescence imaging. For example, changes in at least one of color, fluorescence wavelength, fluorescence intensity, and absorbance are observed. These changes are observed using the naked eye, UV-Vis spectroscopy, fluorescence photometer, etc. and are used for quantitative and qualitative analysis for hypochlorous acid (OCl$^-$).

As an example of the present disclosure, the detection limit of hypochlorous acid (OCl$^-$) of the sensor is 10 μM or less; 5 μM or less; 0.01 to 10 μM; or 0.1 to 5 μM, and this low detection limit may provide high selectivity as well as excellent sensitivity to hypochlorous acid (OCl$^-$).

The present disclosure relates to a photodynamic therapy using a compound represented by chemical formula 1 according to the present disclosure, a salt thereof, or both. According to an example embodiment of the present disclosure, it may include steps of: contacting the cell to be treated with the compound represented by chemical formula 1, pharmaceutically acceptable salt thereof or both; and irradiating light to the contacted cell region.

As an example of the present disclosure, the step of irradiating the light may be performed such that blue light is irradiated to kill the cells to be treated, thereby removing or reducing cells. The step of irradiating the light may be performed for 1 second or more; 1 minute or more; 5 minutes or more; 10 minutes or more; or 30 minutes to 1 hour.

The cell to be treated may be a cancer cell, a tumor cell, or both. In the step of irradiating the light, the compound represented by chemical formula 1, a pharmaceutically acceptable salt thereof, or both may be administered in vivo or ex vivo or mammals or mammals other than humans and then irradiated with light.

According to an example embodiment of the present disclosure, the method may further include a step of analyzing changes in optical properties after the step of irradiating light. After the step of irradiating light, fluorescence imaging of the light-irradiated cell region may be performed, or fluorescence imaging may be performed after treating the light-irradiated cell region with hypochlorous acid (OCl$^-$). This is to utilize photosensitizers as fluorescent dyes for selective detection sensors (probes) and fluorescent imaging agents for in vivo hypochlorous acid (OCl$^-$) as well as anticancer treatment by photodynamic therapy. The analysis may be performed using the above-mentioned analysis method of the sensor or by applying an in vivo applicable analysis method known in the technical field of the present disclosure, which is not specifically mentioned herein.

As follows, although described with reference to preferred example embodiments of the present disclosure, it would be understood by those skilled in the art that various modifications and changes may be made to the present disclosure within the scope, which is without departing from the spirit and scope of the present disclosure as set forth in the claims below.

Synthesis Example

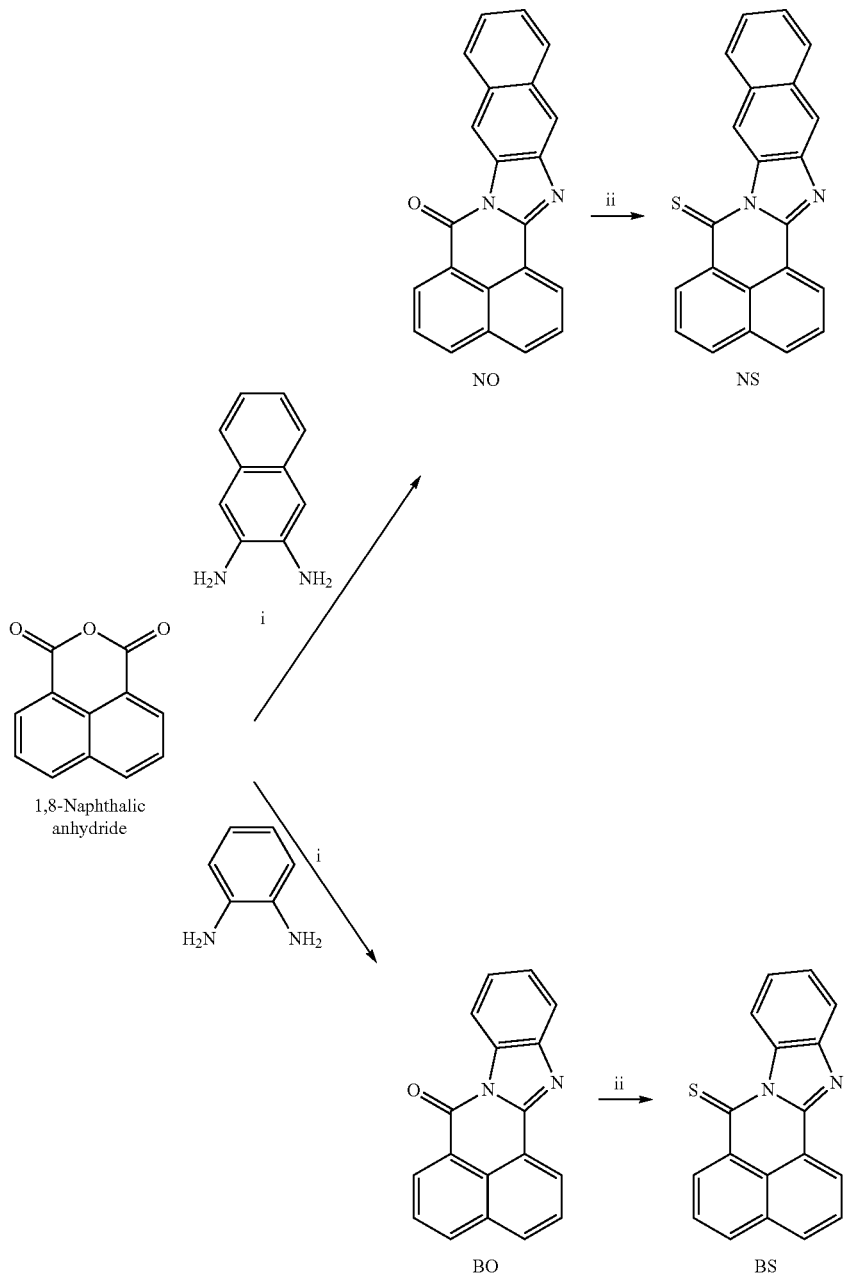

[Scheme 1]

With reference to Scheme 1, BO and NO, respectively, were prepared from 1,8-naphthalic anhydride (1 mmol) having 1,2-diaminobenzene (1.1 mmol) and 1,2-diaminonaphthalene (1.1 mmol). It was synthesized for 2 hours under reflux conditions using propionic acid (50 mL) as a solvent. The filtered precipitate was washed with water to obtain a pure product (yield 90 to 95%). Next, BO and NO (1 mmol), respectively, were mixed and dissolved with "Lawesson's reagent" (1.5 mmol) in p-xylene, and the reaction was carried out under reflux conditions for 18 hours to 20 hours. After cooling, the solvent was removed, and the residue was purified by silica gel column chromatography using n-hexane/ethyl acetate (¼) as an eluent and dried to obtain BS and NS, respectively (yield 30 to 35%).

BO: $^1$H NMR (400 MHz, Chloroform-d) δ8.85; (dd, J=7.4, 1.1 Hz, 1H), 8.79; (dd, J=7.3, 1.2 Hz, 1H), 8.60-8.52; (m, 1H), 8.28; (dd, J=8.2, 1.2 Hz, 1H), 8.15; (dd, J=8.3, 1.1 Hz, 1H), 7.91-7.84; (m, 1H), 7.85-7.77; (m, 2H), 7.53-7.42; (m, 2H); $^{13}$C NMR (101 MHz, Chloroform-d) δ160.83, 149.43, 143.87, 135.42, 132.33, 131.97, 131.77, 127.46, 127.23, 126.99, 125.89, 125.52, 123.24, 120.72, 120.05, 116.00. ESI HRMS m/z=271.0867 [M+H]$^+$, calc. for $C_{18}H_{11}N_2O$=270.08.

NO: $^1$H NMR (400 MHz, Chloroform-d) δ8.95; (q, J=0.7 Hz, 1H), 8.84; (dd, J=7.3, 1.1 Hz, 1H), 8.75; (dd, J=7.3, 1.2 Hz, 1H), 8.26-8.18; (m, 2H), 8.16-8.09; (m, 1H), 8.08-7.94; (m, 2H), 7.84-7.73; (m, 2H), 7.53-7.43; (m, 2H); $^{13}$C NMR (101 MHz, Chloroform-d) δ160.61, 152.16, 143.24, 135.16, 132.55, 132.43, 132.12, 132.02, 131.50, 128.75, 128.63, 127.86, 127.76, 127.46, 127.14, 125.54, 125.38, 123.52, 120.65, 117.44, 113.48; ESI HRMS m/z=321.1025 [M+H]$^+$, calc. for $C_{22}H_{12}N_2O$=320.09.

BS: 1H NMR (400 MHz, Chloroform-d) δ9.43; (ddd, J=8.1, 1.3, 0.6 Hz, 1H), 9.16; (dd, J=7.7, 1.1 Hz, 1H), 8.90; (dd, J=7.3, 1.2 Hz, 1H), 8.26; (ddd, J=8.1, 1.2, 0.5 Hz, 1H), 8.13; (ddd, J=8.1, 1.2, 0.5 Hz, 1H), 7.89; (ddd, J=7.9, 1.4, 0.7 Hz, 1H), 7.82-7.71; (m, 2H), 7.57-7.49; (m, 1H), 7.46; (ddd, J=8.2, 7.3, 1.4 Hz, 1H); $^{13}$C NMR (101 MHz, Chloroform-d) δ190.94, 144.83, 136.00, 134.96, 132.13, 131.81, 129.82, 127.90, 127.61, 127.46, 126.90, 125.59, 121.45, 120.26, 118.09; ESI HRMS m/z=287.0638 [M+H]+, calc. for $C_{18}H_{10}N_2S$=286.06.

NS: $^1$H NMR (400 MHz, Chloroform-d) δ10.04; (s, 1H), 9.17; (d, J=7.6 Hz, 1H), 8.94; (d, J=7.4 Hz, 1H), 8.33-8.20; (m, 2H), 8.18-7.98; (m, 3H), 7.78; (dt, J=10.9, 7.8 Hz, 2H), 7.55-7.50; (m, 2H); $^{13}$C NMR (101 MHz, Chloroform-d) δ189.57, 143.85, 135.60, 134.53, 132.30, 129.55, 128.46, 128.18, 127.53, 126.06, 125.65, 121.28, 117.67, 116.33. ESI HRMS m/z=337.0790 [M+H]$^+$, calc. for $C_{22}H_{12}N_2S$=336.07.

Photophysical Property and Theoretical Calculation

Figure 1B:
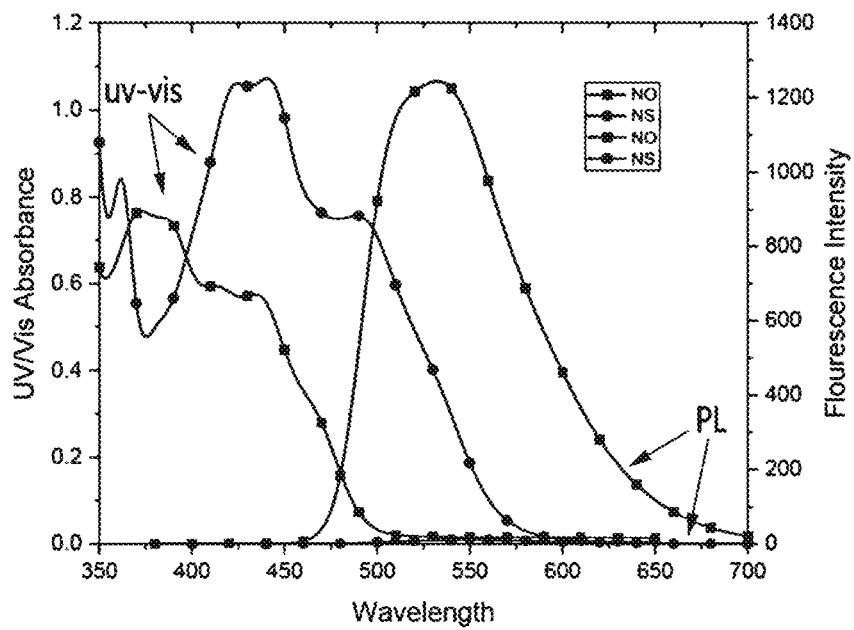
FIG. 1B is a diagram illustrating UV-Vis absorption (black line) and PL spectrum (red line), which shows NO and NS in toluene (60 μM, $\lambda_{ex}$ at the maximum absorption wavelength, slit 5/5) according to an example embodiment of the present disclosure.
Figure 2A:
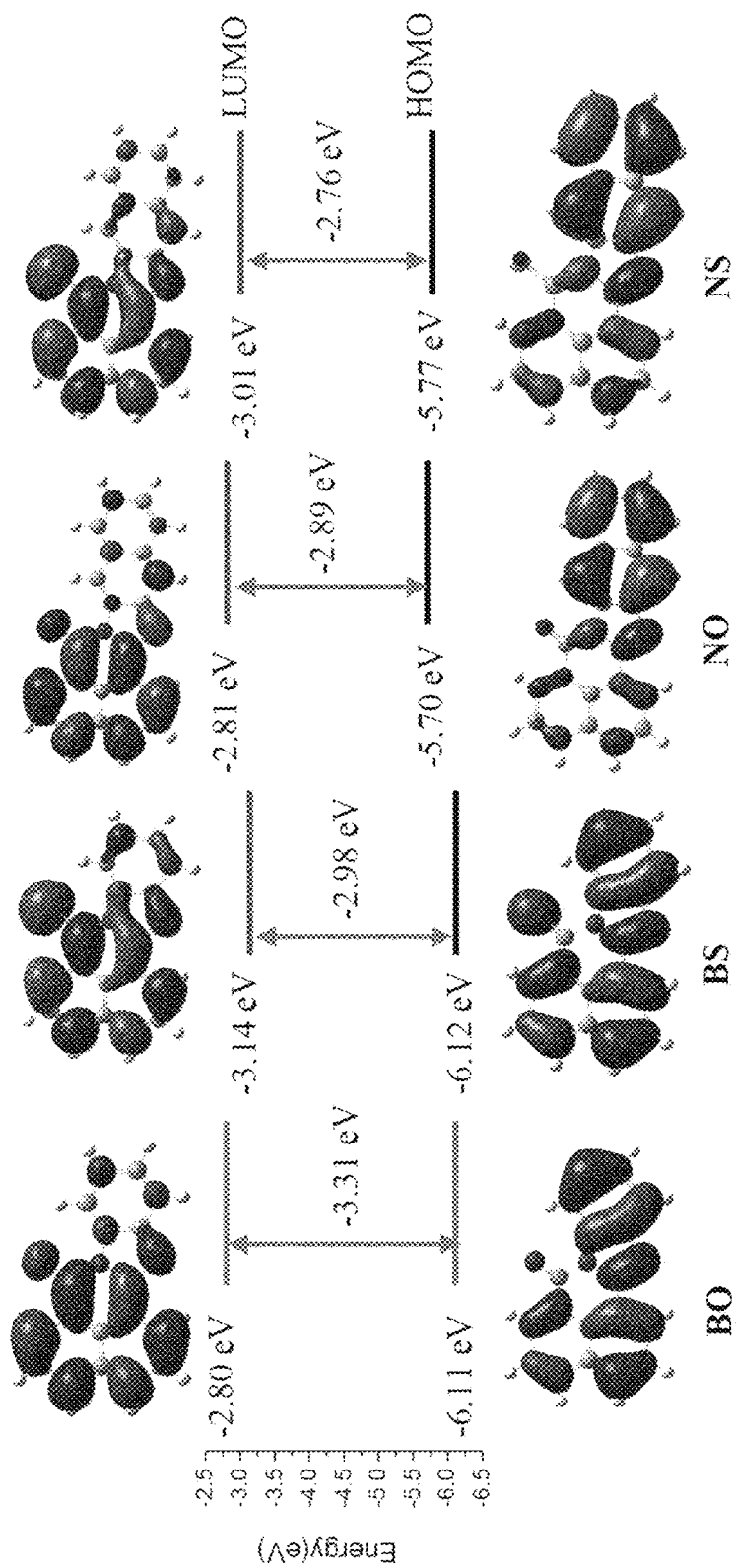
FIG. 2A is a diagram illustrating (a) Frontier molecular orbitals and energies (eV) obtained from theoretical calculations of BO, BS, NO, and NS in the ground state ($S_0$) according to an example embodiment of the present disclosure.

The photophysical properties of the collected products were studied by UV-Vis absorption and fluorescence emission spectroscopy, and the results are shown in FIGS. 1A to 1B and Table 1. In the UV-Vis absorption spectrum, BO and NO show absorption peaks in the region of about 380 nm, and BS and NS show absorption maximum values in the region of about 435 nm. The difference in the absorption peak may be confirmed from the shape difference of the HOMO-LUMO of FIG. 2A.

Compounds BO and NO show strong fluorescence ($\Phi_F$BO=0.71, $\Phi_F$ NO=0.28), but ISC is inefficient due to weak spin-orbit coupling (SOC). On the other hand, enhanced spin-orbit coupling in thionated BS and NS shows singlet oxygen quantum yields of 0.81 and 0.66, respectively.

TABLE 1

| | $\lambda_{abs}{}^a$ (nm) | $\epsilon \times 10^3$ $(M^{-1} cm^{-1})$ | $\lambda_{ems}{}^a$ (nm) | $\Delta V^b$ (nm) | $\Phi_F{}^{a,c}$ | $E_g{}^d$ (eV) | $R(\times 10^{-6})^e$ | $\Phi_\Delta{}^f$ |
|---|---|---|---|---|---|---|---|---|
| BO | 383 | 8.54 | 488 | 105 | 0.71 | 3.31 | 0.05 | — |
| BS | 429 | 10.85 | 495 | 66 | — | 2.98 | 9911.15 | 0.66 |
| NO | 373 | 12.79 | 532 | 159 | 0.28 | 2.89 | 0.08 | — |
| NS | 441 | 17.87 | 551 | 110 | — | 2.76 | 7070.98 | 0.81 |

($^a$in Toluene,
$^b$Stock shift,
$^c$Fluorescence quantum yield evaluated with Rhodamine 6G as the standard ($\Phi_F$ = 0.94 in Ethanol),
$^d E_g$ is the energy difference between the HOMO and LUMO levels,
$^e R[<S|H_{SO}|T>/\Delta E_{ST}]^2$,
$^f$Singlet oxygen quantum yield was determined with respected Ru(bpy)$_3{}^{2+}$ ($\Phi_\Delta$ = 0.57 in ACN)$^{25,26}$
— not observed)

Figure 2B:
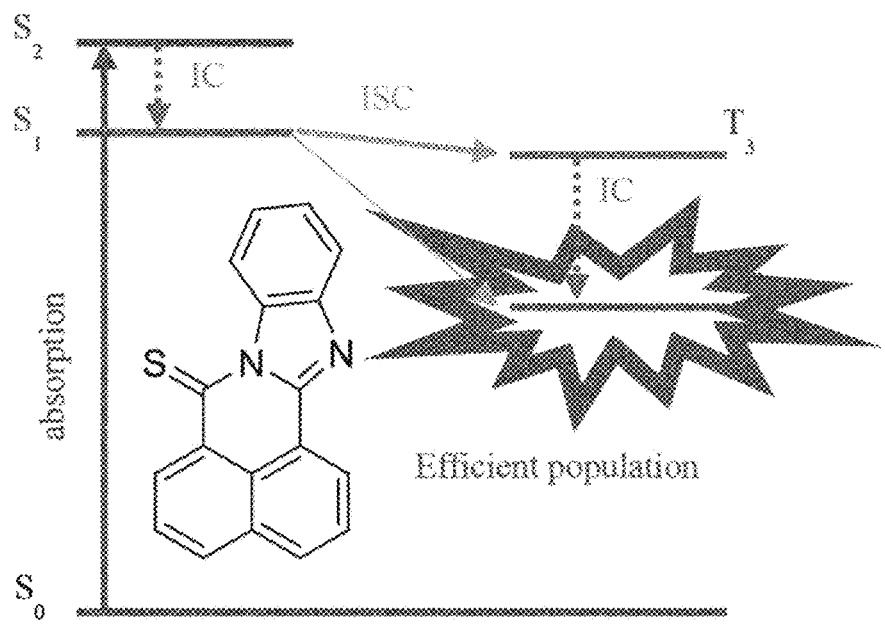
FIG. 2B is a diagram illustrating the triplet state formation mechanism of BS obtained from theoretical calculations of BO, BS, NO, and NS in the ground state ($S_0$), according to an example embodiment of the present disclosure.
Figure 2C:
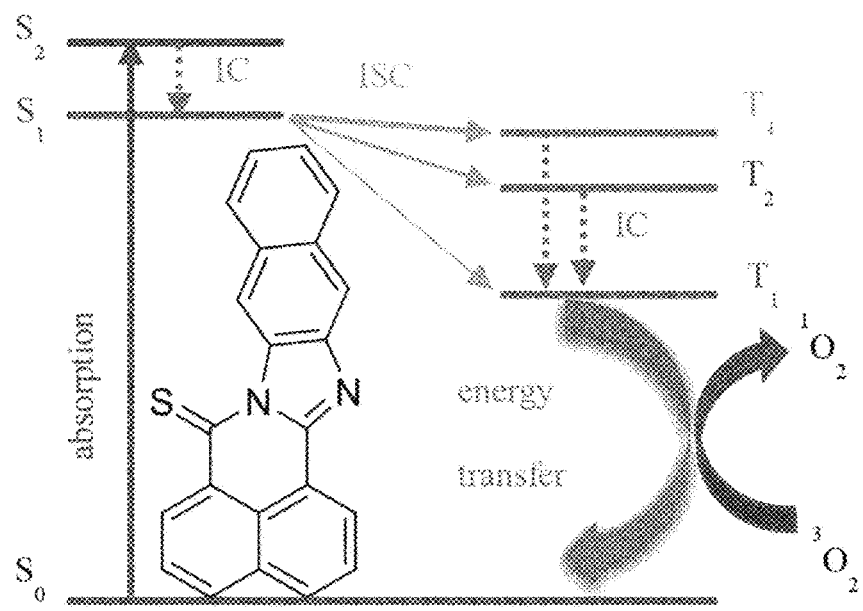
FIG. 2C is a diagram illustrating the triplet state formation mechanism of NS obtained from theoretical calculations of BO, BS, NO, and NS in the ground state $S_0$, according to an example embodiment of the present disclosure.

The triplet state formation mechanism of FIG. 2B and the triplet state of BS in FIG. 2C are mainly formed by ISC from $S_1$ to $T_1$ states, whereas NS is caused by the ISC from $S_1$ to $T_4$ by the maximum ISC rate constant between $S_n \leftrightarrow T_n$. BS and NS are photo-excited directly to the $S_2$ state, proceeding from the ISC to the $T_n$ state or from the IC (internal conversion) to the $S_1$ state and then from the ISC to the $T_n$ state. Introduction of the C=S bond to the NpImidazole core increases the spin-orbit coupling (SOC), and the fluorescence emission of BS and NS improves the ISC process from singlet to triplet-excited states through thionation. Concomitantly, it is quenched at room temperature. This fluorescence quenching is a suitable characteristic as a triplet sensitizer.

PDT Function (In Vitro)

Cell toxicity was evaluated by treating HeLa cells with 10 μM NS and BS solutions, respectively, incubating cells for 30 minutes, and then irradiating blue light (blue LED, 80 mW/cm$^2$) for 5 minutes. The results are shown in FIGS. 3A to 3C and FIGS. 4A to 4D.

Figure 3A:
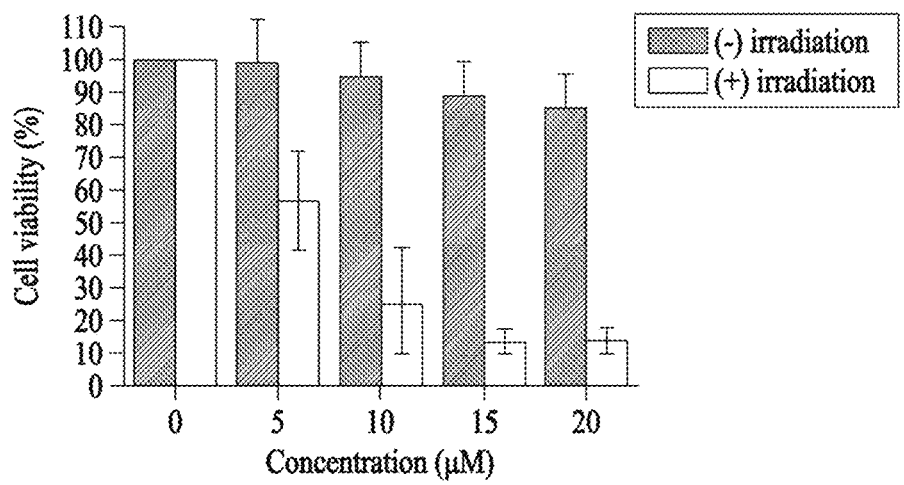
FIGS. 3A to 3C are diagrams illustrating the cell viability of HeLa cells after treatment with BS (FIG. 3A) and NS (FIG. 3B) in dark and light conditions, and the cell viability of HeLa cells after treatment with NS normoxia and hypoxia (FIG. 3C) according to an example embodiment of the present disclosure.
Figure 3B:
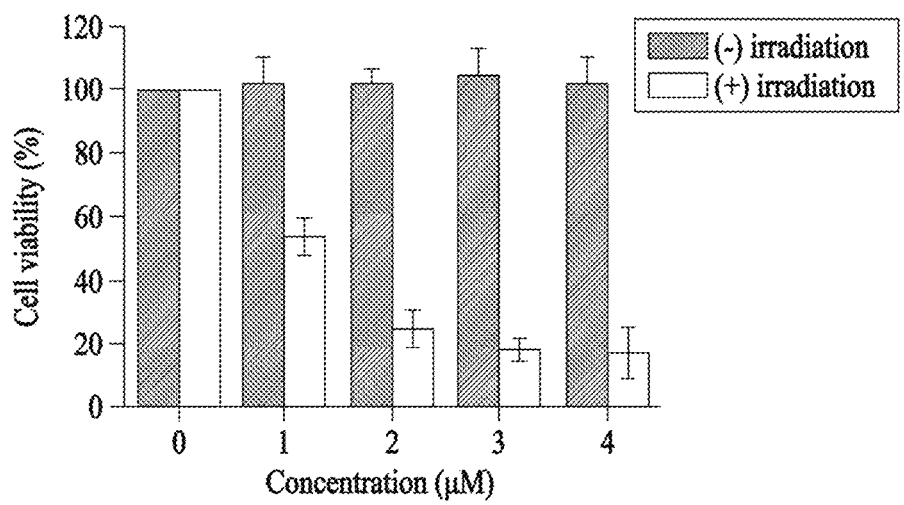
Figure 3C:
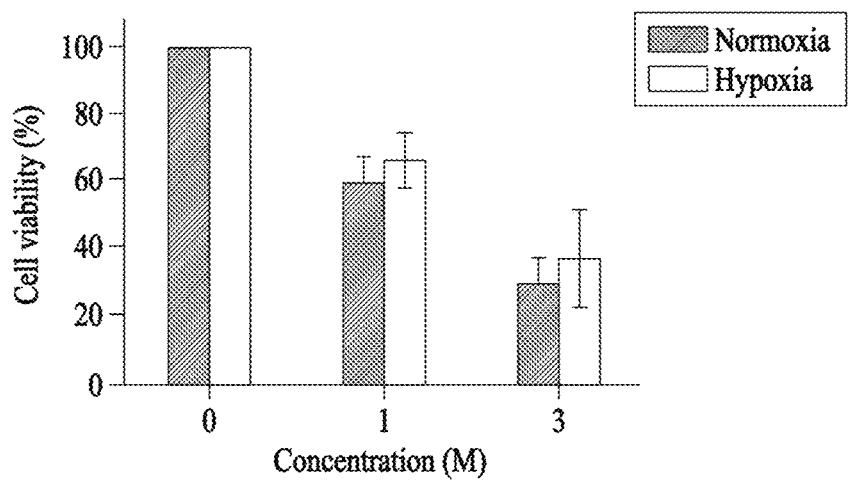
Figure 4A:
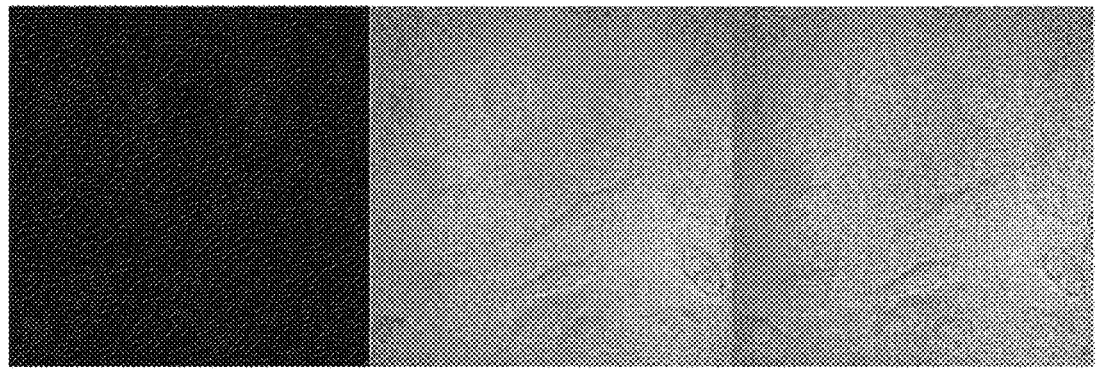
FIG. 4A is a diagram illustrating a fluorescence image of live HeLa cells after incubation in BS (5 μM) and DCFH-DA (10 μM) for 30 minutes.
Figure 4B:
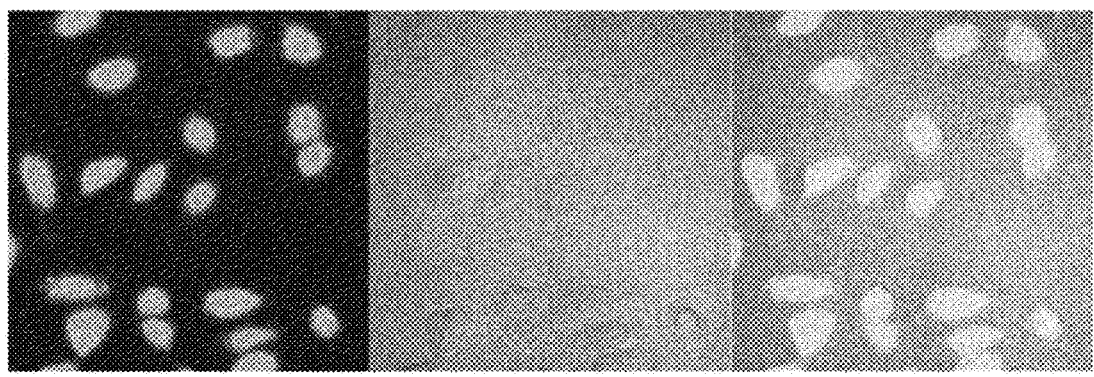
FIG. 4B is a diagram illustrating s a fluorescence image of live HeLa cells after incubation in NS (5 μM) and DCFH-DA (10 μM) for 30 minutes according to an example embodiment of the present disclosure.
Figure 4C:
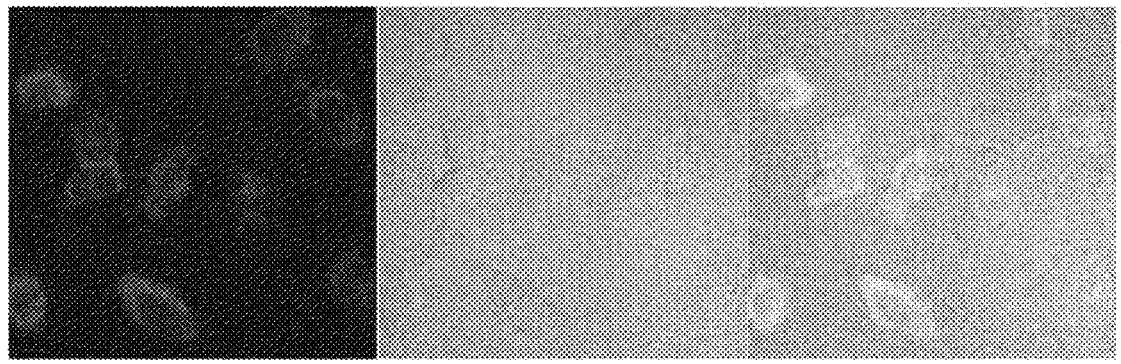
FIG. 4C is a diagram illustrating a BS fluorescence image after light irradiation under blue LED light for 5 minutes thereafter ($\lambda$=473 nm and $\lambda_{em}$=490 to 590 nm) according to an example embodiment of the present disclosure in which these compounds were dissolved in DMSO.
Figure 4D:
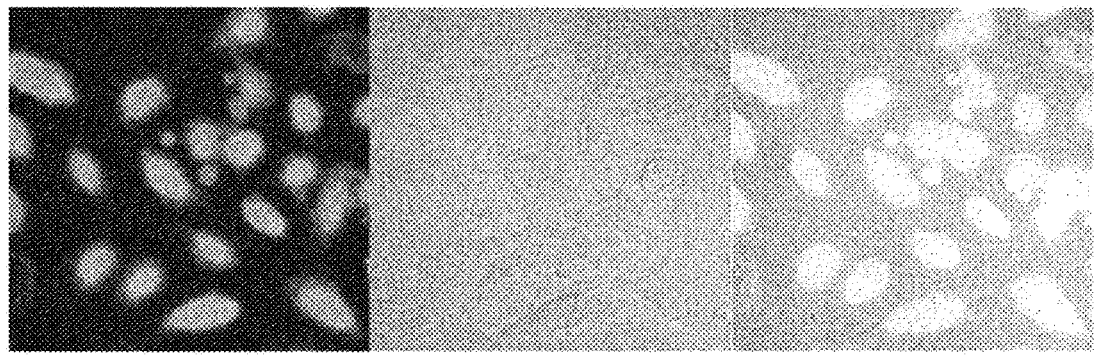
FIG. 4D is a diagram illustrating an NS fluorescence image after light irradiation under blue LED light for 5 minutes thereafter ($\lambda_{ex}$=473 nm and $\lambda_{em}$=490 to 590 nm) in which these compounds were dissolved in DMSO.

Based on the $^1O_2$ generation efficiency and photostability of BS and NS of FIGS. 3A to 3C, photo/dark cytotoxicity to HeLa cells was observed using MTT (traditional methyl thiazolytetralium) assay. FIGS. 3A and 3B show viability of 85% in BS (20 μM) and 97% in NS. The introduction of the C=S bond leads to a highly efficient ISC process, improving the generation of type I and type II ROS, thereby resulting in high $^1O_2$ quantum yield as well as $O_2{}^-$ production. This indicates that BS and NS induce apoptosis with low IC$_{50}$s of 5.81 μM and 1.03 μM, respectively, in normoxia after blue light irradiation. NS induces higher photocytotoxicity than BS by higher oxygen quantum yield and may be utilized as a phototheranostic agent with a low IC$_{50}$ value in normoxia.

Further, in FIG. 3C, NS (3 μM) has a cell viability of 29.6% under a normoxia condition and a cell viability of 36.5% under a hypoxia condition (mixed gas: 5% $CO_2$, 1% $O_2$ and 94% $N_2$) so as to effectively induce photocytotoxicity to HeLa cells. Therefore, it may be confirmed that BS and NS rapidly induce cell death under blue light irradiation in both normoxia and hypoxia.

Referring to the mechanism of type I ROS generation in NS, as shown in Scheme 2, ROS generation of NS is achieved by type I and type II mechanisms, and type I ROS generation is related to the sensitivity of C=S functional groups.

Finally, their fluorescence is completely recovered after hypochlorite anion (OCl$^-$) treatment using the OCl$^-$ probe of live HeLa cells. As shown in FIGS. 4A to 4D, the green signal of DCFH-HA indicates that light-emission after light irradiation leads that BS and NS may generate ROS to induce cancer cell death. It may be confirmed that the C=S group plays an important role in the generation of type I ROS of previously unreported photosensitizers (PS).

[Scheme 2: NS type I ROS generation mechanism]

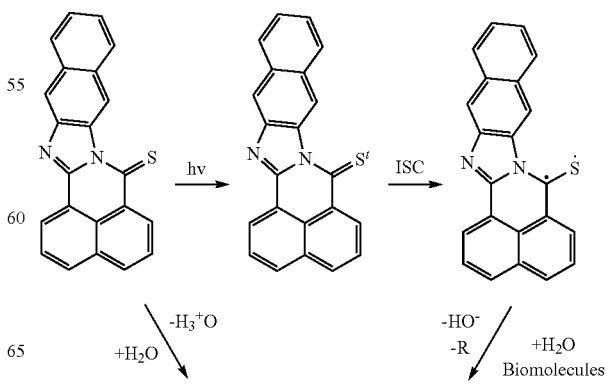

-continued

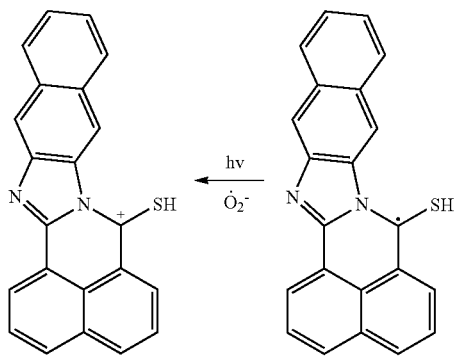

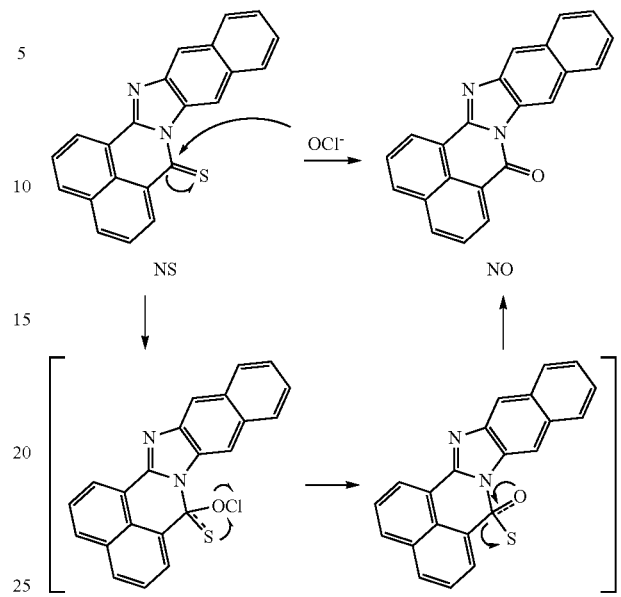

[Scheme 3 NS Desulfurization mechanism by hypochlorous acid (OCl⁻)]

Responsive and Selectively for Detection of OCl⁻—

Figure 5A:
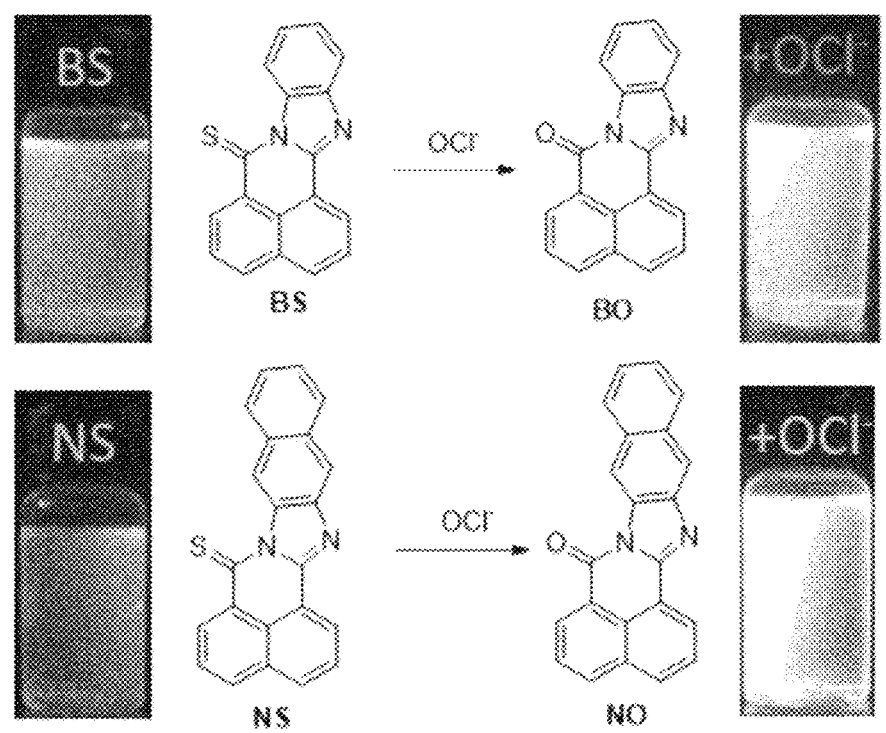
FIG. 5A is a diagram illustrating the formation of BO and NO by $OCl^-$ reaction with BS and NS, respectively and an image of the related solvent under 365 nm illumination according to an example embodiment of the present disclosure.
Figure 5B:
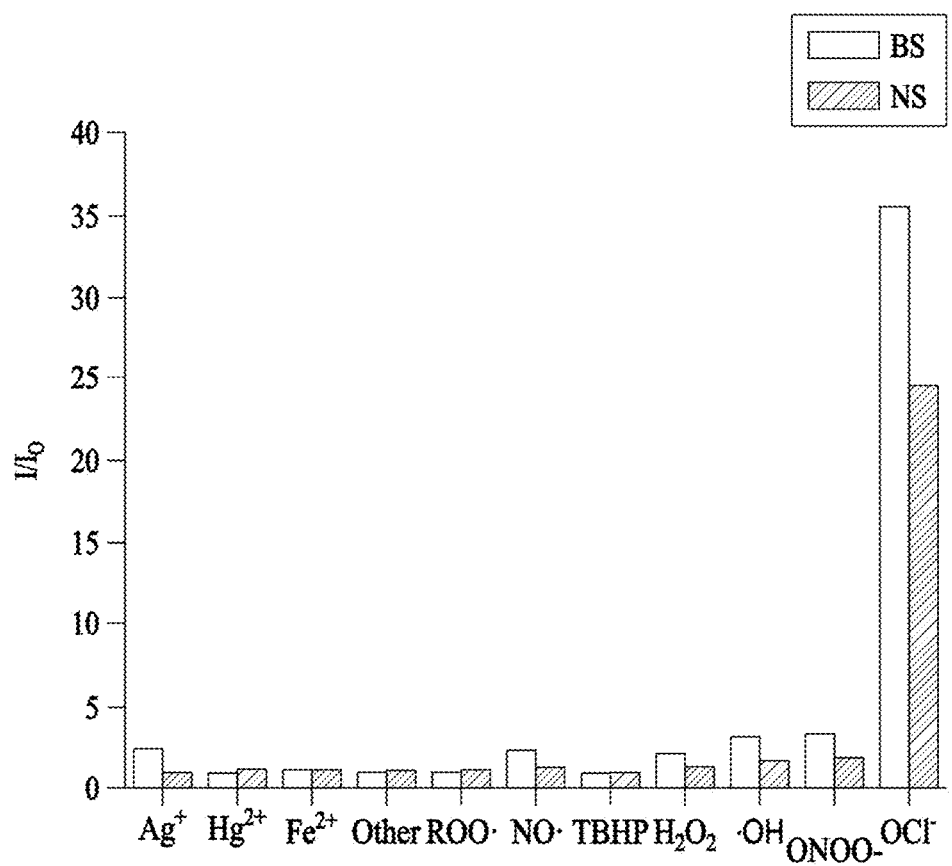
FIG. 5B is a diagram illustrating the fluorescence intensity ratio ($I/I_0$) of BS and NS at a concentration of 20 μM, according to an example embodiment of the present disclosure.

Fluorescence intensity ratios were measured for each of BS and NS in BS buffer (10 mM, pH=7.4) containing 50% THF at the presence of OCl⁻ (60 µM), ROO·(1 mM), NO·(1 mM), $H_2O_2$ (1 mM), TBHP (1 mM), ONOO⁻ (100 µM), ·OH (200 µM) and various metal ions (200 µM): $Ag^+$, $Hg^{2+}$, $Fe^{2+}$, and other ions ($Ni^{2+}$, $Cu^{2+}$, $Zn^{2+}$, $Cd^{2+}$, $Mg^{2+}$, $Ca^{2+}$, $Cr^{3+}$, $Mn^{2+}$, $Fe^{3+}$, $Li^+$, $Na^+$, $K^+$, $Cs^+$). The fluorescence intensities of BS and NS were 505 nm and 559 nm, respectively, and the results are shown in FIGS. 5A and 5B. Recognition of ROS, RNS and metal cations by BS and NS was investigated through colorimetric changes, UV absorption and fluorescence emission changes in PBS 7.4 pH/THF (5/5). It may be confirmed that only OCl⁻ (60 µM) may significantly induce "fluorescence turn-on" in BS (20 µM) or NS (20 µM) solutions (FIG. 5A). This indicates high selectivity of BS and NS for OCl⁻ among various analytes (FIG. 5B).

As shown in FIGS. 6A to 6D, when OCl⁻ (NaClO, 0 to 75 µM) is gradually added to a BS (20 µM) solution (PBS buffer, 10 mM, pH 7.4, containing 50% THF), the absorption band gradually decreases at 440 nm, and at the same time, a new absorption band (a characteristic of BO) increases at 382 nm. Similarly, in FIG. 6C, the broad absorption band decreases in the 420 to 600 nm range of the NS solution, whereas the absorption band at 370 nm gradually increases with OCl⁻-addition (a characteristic of NO). UV-vis titration of BS and NS for OCl⁻ ions shows isosbestic points at 403 nm and 411 nm, respectively, which change from yellow to pale yellow with color.

Figure 6A:
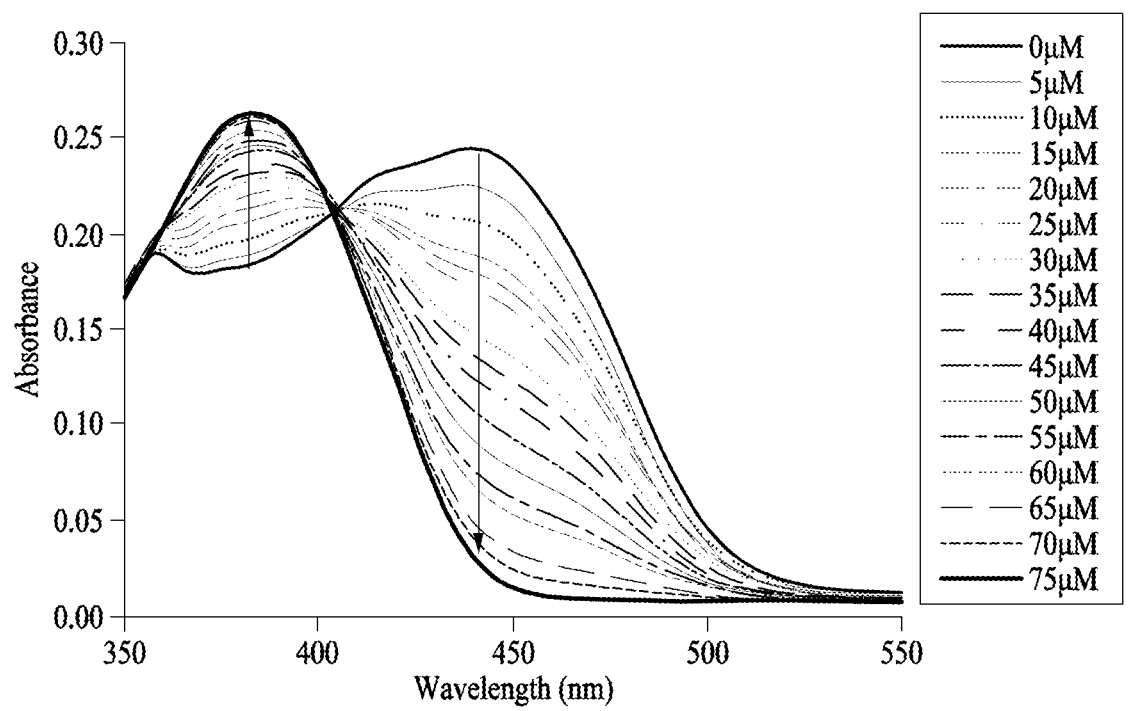
FIG. 6A is a diagram illustrating the UV-Vis absorption spectrum of BS ($\lambda_{ex}$=405 nm) by adding $ClO^-$ (0 to 75 μM) addition in THF/PBS mixture (50:50) (20 μM, slit 5/5), according to an example embodiment of the present disclosure.
Figure 6B:
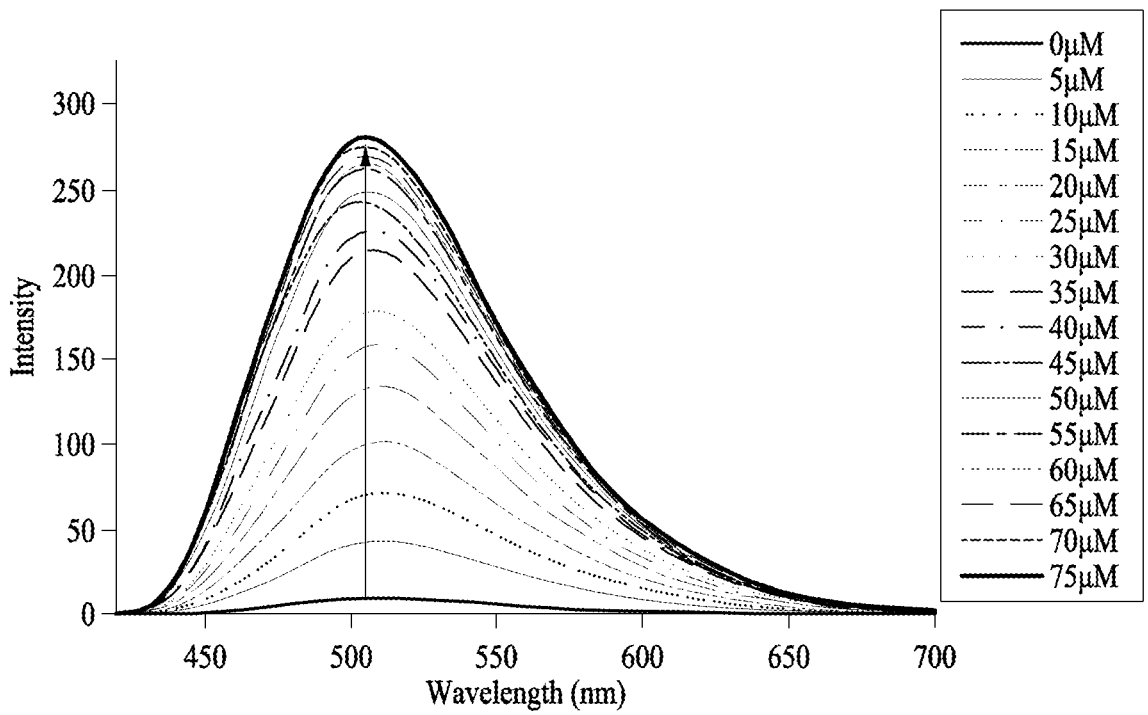
FIG. 6B is a diagram illustrating the PL spectrum of BS ($\lambda_{ex}$=405 nm) by adding $ClO^-$ (0 to 75 μM) addition in THF/PBS mixture (50:50) (20 μM, slit 5/5), according to an example embodiment of the present disclosure.
Figure 6C:
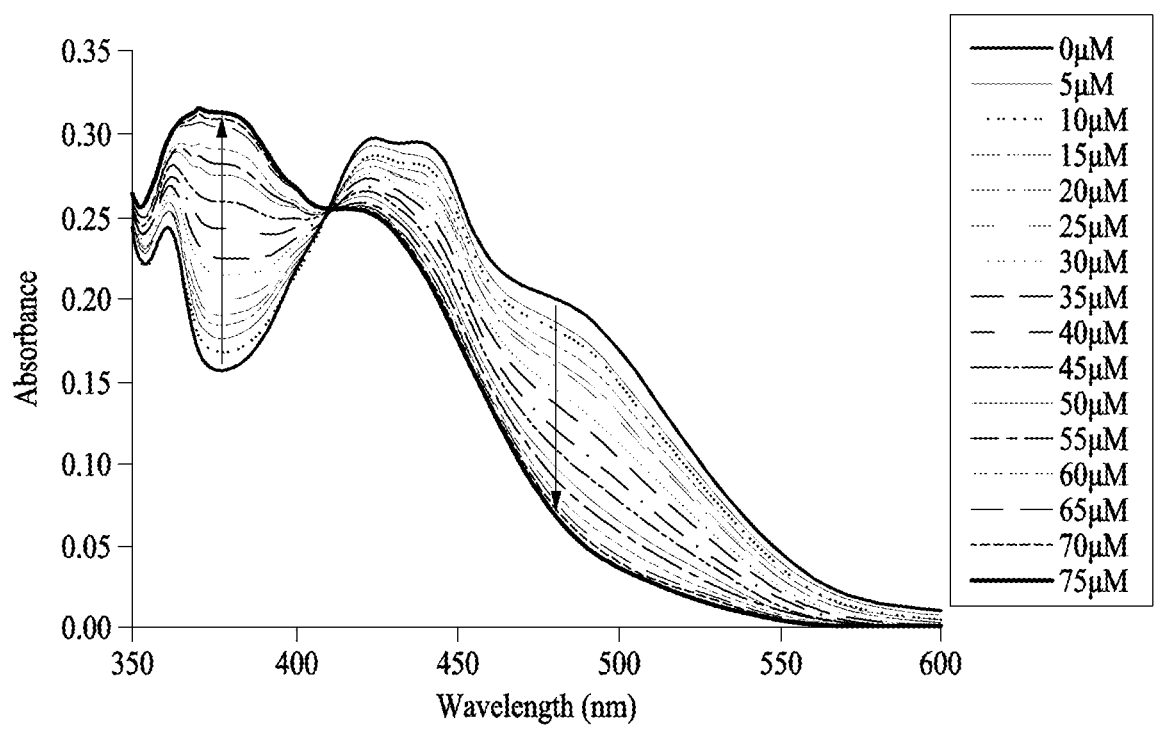
FIG. 6C is a diagram illustrating the UV-Vis absorption spectrum of NS (c, d) ($\lambda_{ex}$=410 nm) by adding $ClO^-$ (0 to 75 μM) addition in THF/PBS mixture (50:50) (20 μM, slit 5/5), according to an example embodiment of the present disclosure.
Figure 6D:
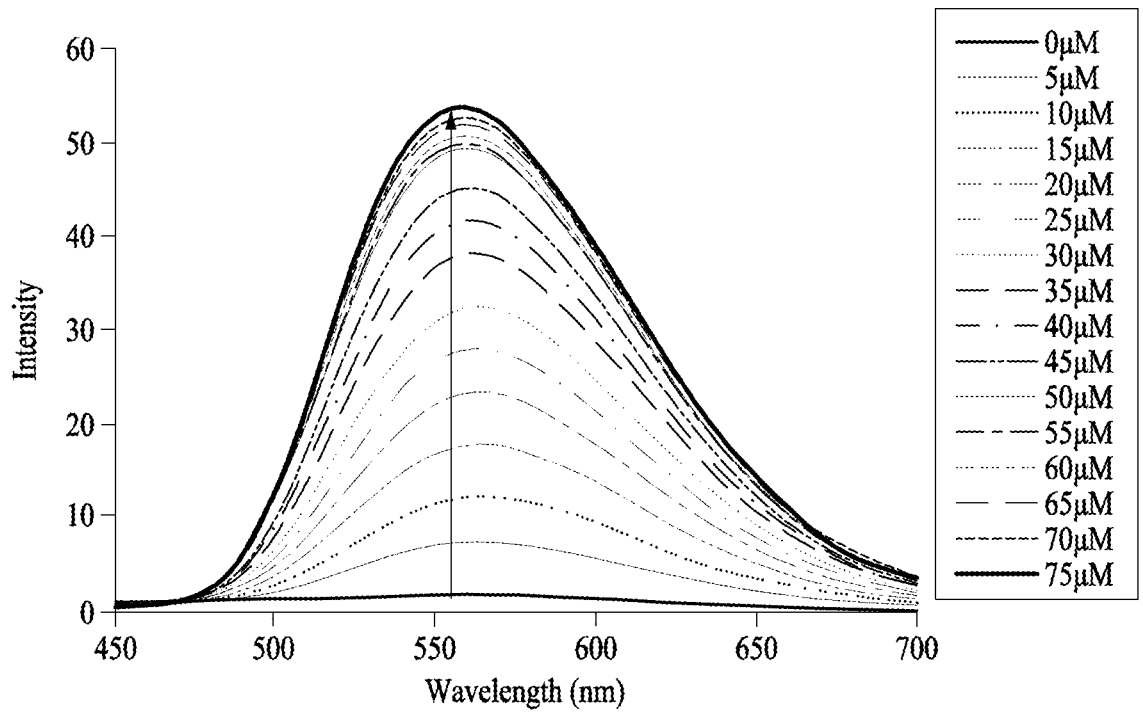
FIG. 6D is a diagram illustrating the PL spectrum of NS ($\lambda_{ex}$=410 nm) by adding $ClO^-$ (0 to 75 μM) addition in THF/PBS mixture (50:50) (20 μM, slit 5/5), according to an example embodiment of the present disclosure.
Figure 7A:
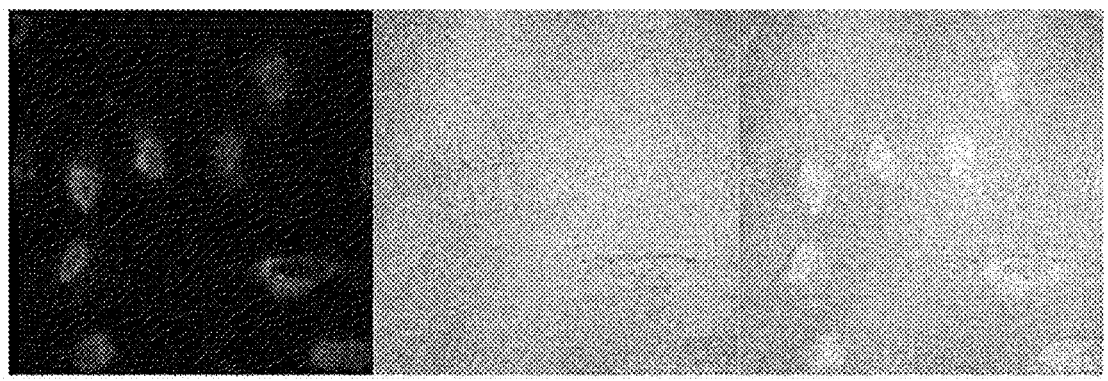
FIGS. 7A to 7D are diagrams illustrating fluorescence images of live HeLa cells incubated with BS (FIG. 7A) and NS (FIG. 7C) having a concentration of 10.0 μM for 10 minutes and fluorescence images of live HeLa cells incubated with BS (FIG. 7B) and NS (FIG. 7D) for 10 minutes after treatment with $OCl^-$ (3 eq) according to an example embodiment of the present disclosure in which BS and NS, respectively, are dissolved in DMSO, and the fluorescence image is measured at a condition of $\lambda_{ex}$=405 nm and $\lambda_{em}$=490 to 590 nm.
Figure 7B:
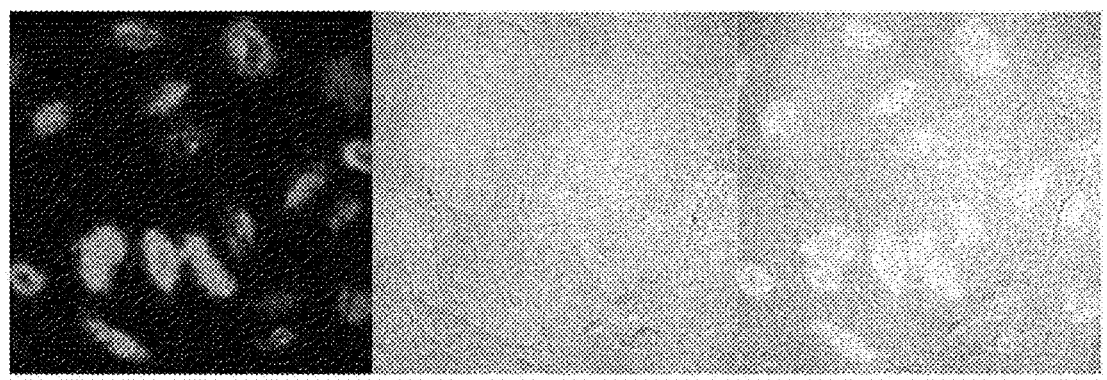
Figure 7C:
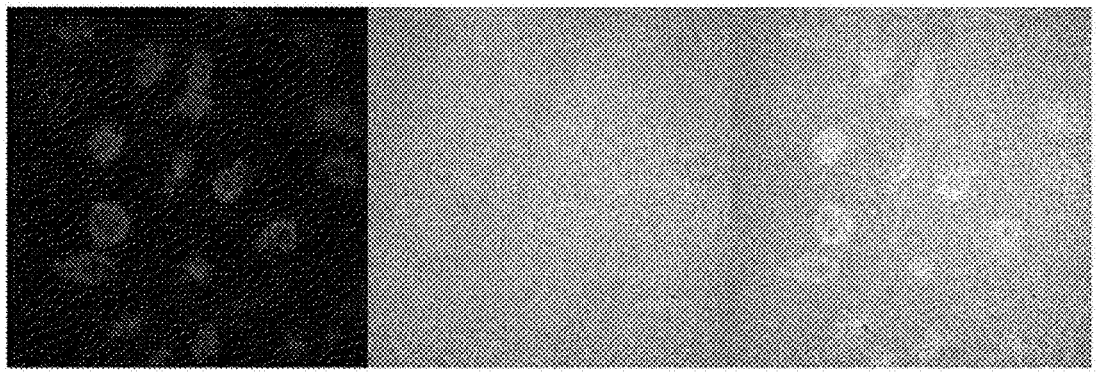
Figure 7D:
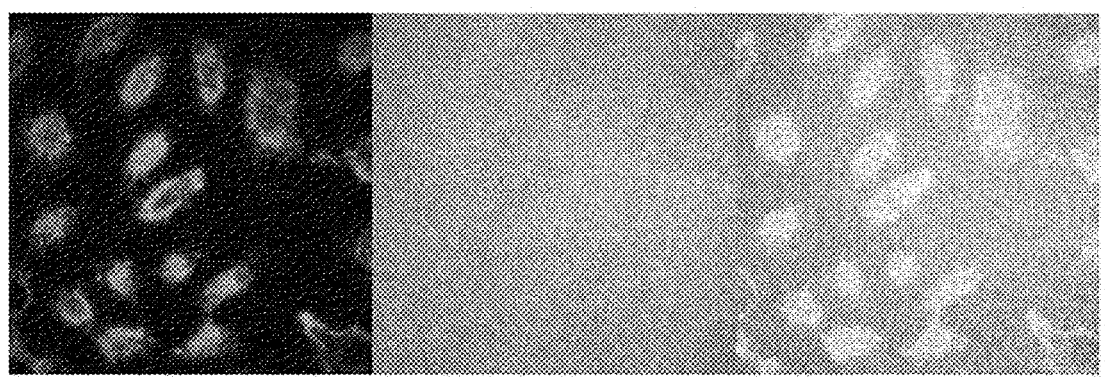

In Scheme 3, the photophysical change by oxidative desulfurization from the C═S groups of BS and NS to the corresponding C═O groups of BO and NO by hypochlorous acid (OCl⁻) may be shown. As shown in FIGS. 6B and 6D, the fluorescence intensity (505 nm and 559 nm, respectively) of the BS and NS solutions significantly increased at OCl⁻ concentrations of 3.17 µM to 0.30 µM.

Bio-Imaging

HeLa cells were treated with 10 µM NS and BS solutions, respectively. Then, HeLa cells were incubated for 10 minutes and then incubated with hypochlorous acid (OCl⁻) for 10 minutes to perform hypochlorous acid (OCl⁻) detection fluorescence signal and bioimaging. The results are shown in FIGS. 7A to 7D.

As shown in FIGS. 7A to 7D, BS and NS as intracellular OCl⁻ probes inside HeLa cells were visualized by confocal fluorescence intensity microscopy. As shown in FIG. 7, HeLa cells treated with BS or NS showed very weak and strong fluorescence signals before and after incubation with OCl⁻, respectively. These experiments indicate that the probes BS and NS may adequately detect OCl⁻ in living cells. Accordingly, the BS and NS correspond to heavy metal-free photosensitizers having the function of detecting OCl⁻ with high selectivity and sensitivity.

The present disclosure relates to a novel heavy metal atom-free photosensitizer having a high singlet oxygen quantum yield by combining naphthalimides and imidazole, and effectively generating a triplet-excited state, so that a "thionated NpImidazole" derivative is designed and synthesized. The synthesized BS and NS showed negligible cancer cell toxicity to HeLa cells at the working concentration, whereas under blue light irradiation, BS and NS may rapidly induce apoptosis in both normoxia and hypoxia conditions. Finally, photophysical changes by oxidative desulfurization of C═S groups of BS and NS to BO and NO-related C═O groups through hypochlorite may occur. This confirmed the dual function of BS and NS as an anti-cancer therapeutic agent such as PDT and a fluorescent imaging agent for OCl⁻, suggesting that it has the possibility of activity for a "one-for-all" as well as a multifunctional agent.

As described above, although the example embodiments have been described with reference to the limited example embodiments and drawings, various modifications and variations are possible from the above description by those skilled in the art. For example, even if the described techniques are performed in an order different from the described scheme, and/or the described components are connected or combined in a different form from the described scheme, or replaced or substituted by other components or equivalents, appropriate results may be achieved. Therefore, other implementations, other example embodiments, and equivalents to the claims are also within the scope of the following claims.

The invention claimed is:

1. A compound represented by chemical formula 1-2, a salt thereof, or both:

[Chemical formula 1-2]

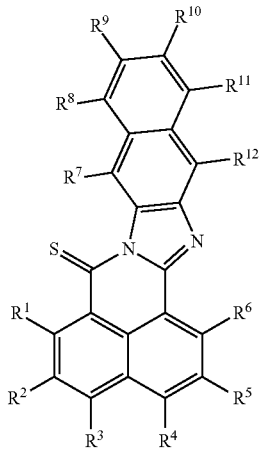

wherein $R^1$ to $R^6$ are, independently, selected from the group consisting of hydrogen, halogen, straight or branched chain alkyl having 1 to 10 carbon atoms, alkenyl having 2 to 10 carbon atoms, and aryl having 6 to 10 carbon atoms, and $R^7$ to $R^{12}$ are, independently, selected from the group consisting of hydrogen, halogen, straight or branched chain alkyl having 1 to 10 carbon atoms and alkenyl having 2 to 10 carbon atoms.

2. The compound of claim 1, wherein the compound is a heavy metal-free triplet photosensitizer for fluorescence imaging and photodynamic therapy.

3. A composition comprising the compound represented by chemical formula 1-2 of claim 1, a salt thereof, or both.

4. The composition of claim 3, comprising the salt and wherein the salt is a pharmaceutically acceptable salt.

5. The composition of claim 1, wherein the photodynamic therapy allows a removal or reduction of cancer cells, tumor cells or hyperproliferative cells.

6. The composition of claim 3, wherein the composition allows for selective detection and fluorescence imaging of in vivo or in vitro hypochlorous acid ($OCl^-$).

7. The composition of claim 3, wherein
the composition further comprises water, an organic solvent, or both, and a pH of the composition is 7 to 8.

8. A sensor for detection of hypochlorous acid ($OCl^-$), the sensor comprising the compound represented by chemical formula 1-2 of claim 1, a salt thereof or both, wherein the sensor has a selective optical property change with respect to $OCl^-$.

9. The sensor of claim 8, wherein
the sensor is a fluorescent sensor, and
the sensor measures a fluorescence signal or performs fluorescence imaging.

10. The sensor of claim 8, wherein the sensor measures a change in fluorescence intensity according to Equation 1 below:

$$(I/I_0) \geq 10$$

wherein I represents fluorescence intensity after contacting with hypochlorous acid ($OCl^-$) and $I_0$ represents initial fluorescence intensity.

11. The sensor of claim 8, wherein a detection limit for hypochlorous acid (OCl—) of the sensor is 5 µM or less.

12. A method for photodynamic therapy, the method comprising:
contacting the compound represented by chemical formula 1-2 of claim 1, a pharmaceutically acceptable salt thereof, or both with a cell to be treated; and
irradiating light to the contacted cell region.

13. The method of claim 12, wherein the irradiating of the light causes extinction of the cell to be treated by irradiating blue light.

14. The method of claim 12, further comprising, after the irradiating of the light, analyzing optical property change of the light-irradiated cell region.

15. The method of claim 14, wherein the analyzing of the optical property change comprises performing fluorescence imaging of the light-irradiated cell region or performing fluorescence imaging after treating the light-irradiated cell region with a hypochlorous acid ($OCl^-$) solution.

* * * * *